United States Patent [19]
Wiley

[11] 3,734,233
[45] May 22, 1973

[54] SONIC LOGGING APPARATUS
[75] Inventor: Bruce F. Wiley, Bartlesville, Okla.
[73] Assignee: Phillips Petroleum Company, Bartlesville, Okla.
[22] Filed: Oct. 1, 1969
[21] Appl. No.: 862,849

[52] U.S. Cl. ............. 181/.5 AG, 340/17, 181/.5 OS
[51] Int. Cl. .............................................. G01v 1/40
[58] Field of Search ................... 340/17; 181/.5 AG, 181/.5 FS

[56] References Cited

UNITED STATES PATENTS

| | | |
|---|---|---|
| 2,938,592 | 5/1960 | Charske et al. ........................ 181/.5 |
| 3,311,875 | 3/1967 | Geyer et al. ........................... 340/18 |
| 3,231,041 | 1/1966 | Kokesh .................................. 181/.5 |
| 2,530,971 | 11/1950 | Kean ..................................... 181/.5 |
| 2,737,639 | 3/1956 | Summers et al. ..................... 340/18 |
| 3,009,131 | 11/1961 | Woodworth ........................... 340/17 |
| 3,063,035 | 11/1962 | Vogel et al. ........................... 340/17 |
| 3,368,196 | 2/1968 | Mazzagatti et al. ................... 340/18 |

OTHER PUBLICATIONS

Stern, Silicon Controlled Rectifiers, Electronics World, October, 1963, pp. 27–30.

Primary Examiner—Benjamin A. Borchelt
Assistant Examiner—N. Moskowitz
Attorney—Young and Quigg

[57] ABSTRACT

Acoustical logging apparatus having two signal generators and a receiver carried by an elongated housing in spaced relationship. The generators comprise coils mounted on magnetostrictive members. The connecting leads are disposed outside the coils to avoid stray signals being induced.

5 Claims, 4 Drawing Figures

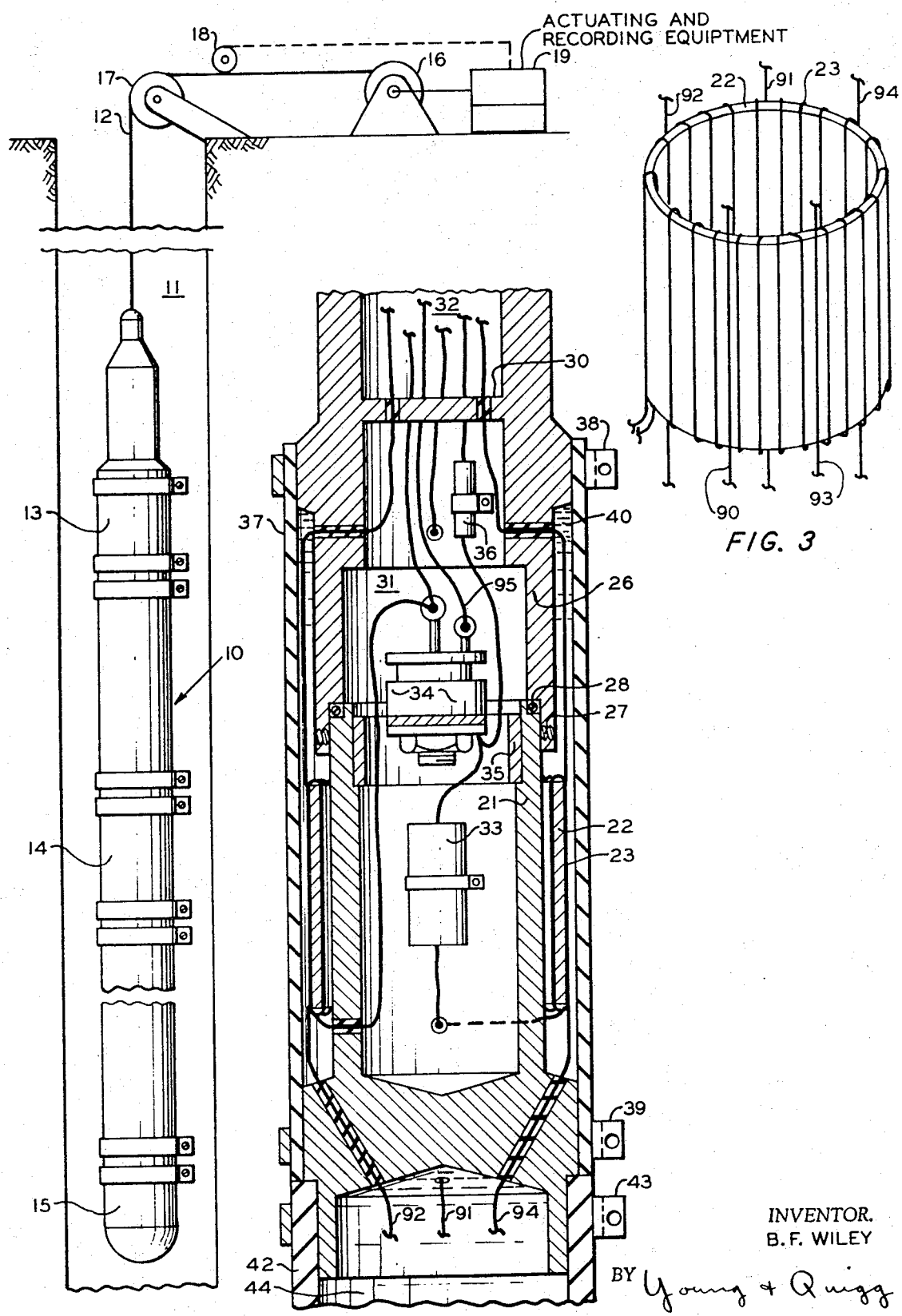

SONIC LOGGING APPARATUS

Various types of logging equipment have been developed for use in measuring properties of earth formations which are intersected by well bores. One logging procedure measures the velocity of propagation acoustical signals through the formations to provide information which is useful in the interpretation of seismic records. Measurements of this type can be made by suspending in a bore hole a logging tool which has one or more spaced signal generators mounted therein in spaced relationship with one or more receivers. By measuring the time of travel of sound waves from a generator to a receiver or between two receivers it is possible to determine the velocity at which acoustical signals travel through surrounding earth formations.

It is common practice to construct the signal generators by winding a coil on a hollow cylindrical core of magnetostrictive material. A large pulse of current is passed through the coil, and the resulting magnetic field deforms the core to produce an acoustical pulse. Apparatus of similar configuration can be employed as the receiver. In this case, the received acoustical pulse deforms the magnetostrictive core element to generate an electrical pulse in the surrounding core. It is generally desirable to position the transmitter and the receiver as close as possible to the wall of the bore hole so that a substantial portion of the acoustical energy is directed through the earth formation rather than directly through the bore hole fluid. Because of this requirement, it has been common practice to pass connecting electrical leads through the interior of the transmitters and/or receivers. Unfortunately, this construction has resulted in the generation of extraneous signals in the connecting leads whenever a current pulse is passed through a coil or a signal is generated in a coil. These extraneous signals have often made it quite difficult to interpret the well logs accurately.

In accordance with this invention, improved apparatus is provided for use in making acoustical surveys in bore holes. The signal transmitter is constructed by positioning a core of magnetostrictive material about a hollow mandrel. The electrical components associated with the signal generator are positioned in part within the mandrel so as to be located immediately adjacent the coil. This reduces the length of connecting leads and provides maximum signal generation. The connecting leads should be as short as possible because of the large current surges. The apparatus is further constructed in such a manner that electrical leads from an adjacent transmitter and/or receiver pass on the outside of the core of the transmitter rather than through the core. This substantially reduces the generation of extraneous signals when a pulse is applied to the coil of the first-mentioned transmitter. The apparatus of this invention advantageously is constructed by connecting the transmitters and receivers by means of a flexible hose formed of a material that is a poor sound transmitter. This serves to minimize the passage of acoustical energy through the bore hole. Another feature of this invention involves circuit means to energize two transmitters selectively.

In the drawing;

FIG. 1 illustrates the acoustical logging equipment of this invention positioned within a bore hole.

FIG. 2 is a detailed view, shown partially in section, of a portion of the logging apparatus of FIG. 1.

FIG. 3 illustrates one of the signal transmitters of the logging apparatus having connecting leads associated therewith.

Figure 4:
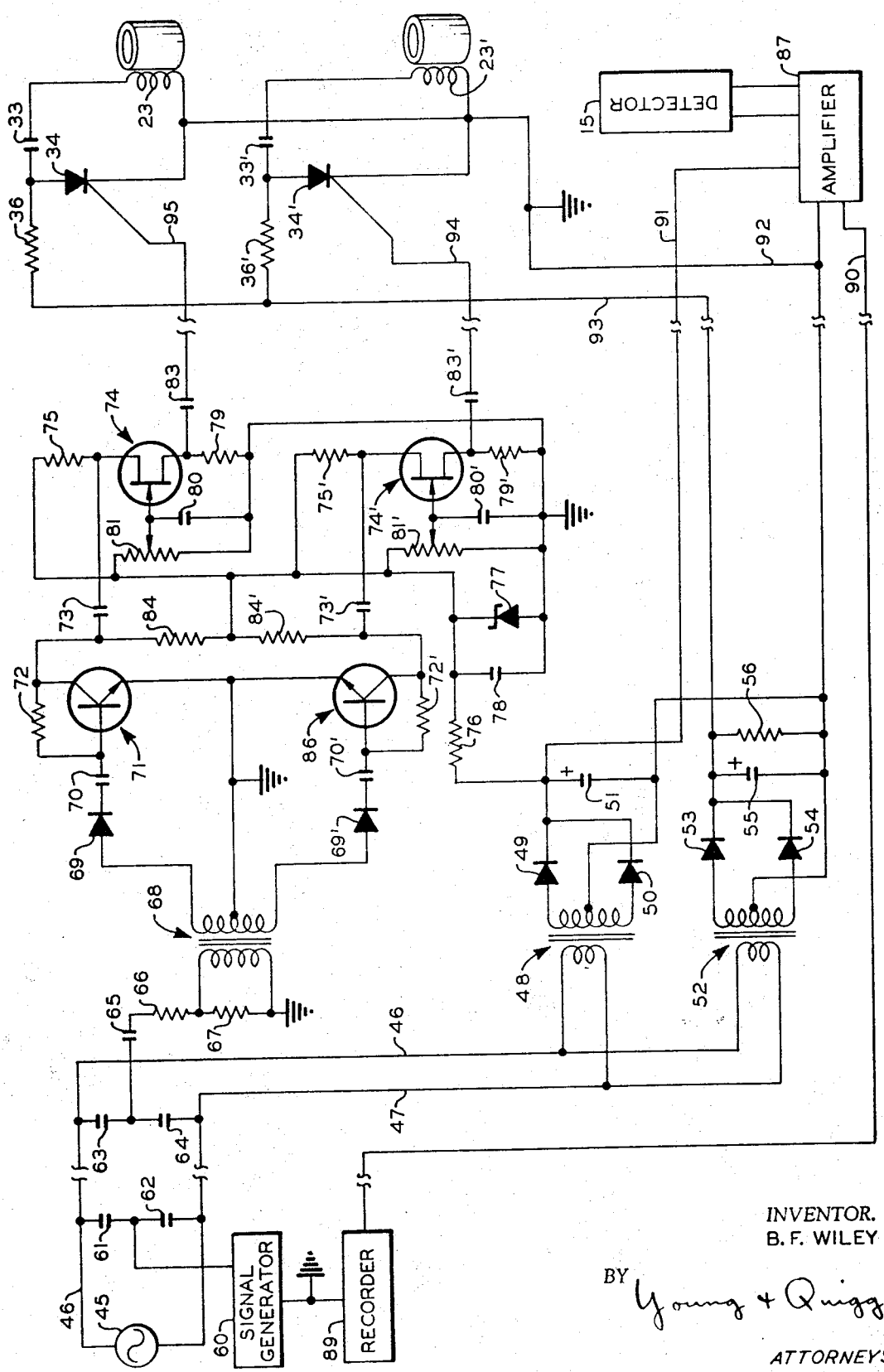
FIG. 4 is a schematic circuit drawing of the electrical equipment associated with the logging apparatus of FIG. 1.

Referring now to the drawing in detail and to FIG. 1 in particular, there is shown an elongated housing 10 which is suspended within a bore hole 11 by means of a cable 12. Housing 10 includes spaced sections 13 and 14 which contain sonic transmitters. A section 15 houses a sonic receiver. The upper end of cable 12 is connected to a reel 16 which serves to raise and lower housing 10 in the bore hole. Reel 16 can be driven by a suitable motor, not shown. Cable 12 extends from reel 12 over a pulley 17. An odometer wheel 18 engages cable 12 to provide a signal representative of the depth to which housing 10 is lowered into the bore hole. This depth signal and the output signal from the downhole receiver is transmitted to actuating and recording equipment 19.

As illustrated in detail in FIG. 2, transmitter 13 is supported by a mandrel 21 which is constructed of brass or other non-magnetic material. A hollow cylindrical core 22 of magnetostrictive material surrounds mandrel 21. A toroidal coil 23 is mounted on core 22, as illustrated in FIG. 3. The lower region of mandrel 21 is provided with one or more passages through which connecting leads such as 91, 92 and 94 extend. A housing 26 is attached to the upper end of mandrel 21 by means of set screws 27. A fluid-tight seal between the two members is accomplished by use of an O-ring 28. Housing 26 is provided with a partition 30 which divides the housing into lower and upper regions 31 and 32, respectively.

A capacitor 33 is mounted within mandrel 21. A silicon controlled rectifier 34 is mounted on an inverted cup-shaped support 35 which is inserted in the upper region of housing 26, and a resistor 36 is mounted within the upper section of region 31. A sleeve 37 of flexible material, such as rubber, is attached at its upper end to housing 26 by a clamping ring 38 and at its lower end to mandrel 21 by a clamping ring 39. The region between sleeve 37 and the elements enclosed thereby is filled with a hydraulic fluid 40, such as oil, which serves as an insulator and provides a pressure balancing means.

A second sleeve 42 is secured to the lower end of mandrel 21 by a clamping ring 43. Sleeve 42 extends downwardly and supports transmitter 14 and receiver 15 of FIG. 1. This sleeve is advantageously formed of a relatively heavy material, such as wire reinforced rubber tubing, which provides the desired strength and rigidity. The interior of sleeve 42 is also filled with a hydraulic fluid 44.

The electrical circuit employed to actuate the transmitters and to record output signals from the receiver is illustrated in FIG. 4. Operating power is supplied by a source of alternating current 45 which is positioned at the surface. Source 45 is connected to the downhole equipment by leads 46 and 47 which extend through cable 12. The primary winding of a first transformer 48 is connected across leads 46 and 47. The end terminals of the secondary winding of transformer 48 are connected through respective rectifiers 49 and 50 to the first terminal of a capacitor 51, the second terminal of which is grounded, as is the center tap of the secondary winding of transformer 48. This circuit provides a first source of relatively low voltage to operate the downhole transistors. A relatively high voltage to actuate the transmitters is provided by a second transformer 52, the primary winding of which is connected across leads 46 and 47. The end terminals of the secondary winding of transformer 52 are connected through respective rectifiers 53 and 54 to the first terminal of a capacitor 55. The second terminal of capacitor 55 is connected to the center tap of the secondary winding of transformer 52 and to ground.

The first terminal of capacitor 55 is connected to the first terminal of resistor 36. The second terminal of resistor 36 is connected to ground through rectifier 34. Coil 23 and capacitor 33 are connected in series with one another across rectifier 34. Capacitor 33 is thus charged to a high potential through resistor 36 and coil 23, and is discharged through coil 23 when rectifier 34 receives a pulse from a trigger circuit to be described. The resulting discharge of capacitor 33 through coil 23 establishes an acoustical pulse due to the enclosed magnetostrictive core 22 being deformed.

The pulses to trigger rectifier 34 are obtained from a signal generator 60 which is positioned at the surface. The first output terminal of signal generator 60 is connected through capacitors 61 and 62 to respective leads 46 and 47. The second output terminal of signal generator 60 is connected to ground. Capacitors 63 and 64 are connected in series between leads 46 and 47 in the downhole equipment. The junction between capacitors 63 and 64 is connected to the first terminal of a capacitor 65, the second terminal of which is connected to ground through series connected resistors 66 and 67. The primary winding of a transformer 68 is connected across resistor 67. The first and terminal of the secondary winding of transformer 68 is connected through a rectifier 69 and a capacitor 70 to the base of a transistor 71. The emitter of transistor 71 is connected to ground, as is the center tap of the secondary winding of transformer 68. A resistor 72 is connected between the collector and the base of transistor 71. The collector of transistor 71 is connected by a capacitor 73 to the first emitter of a transistor 74. This first emitter of transistor 74 is connected by a resistor 75 and a resistor 76 to the positive terminal of capacitor 51. A voltage regulating Zener diode 77, having a capacitor 78 connected in parallel therewith, is connected between ground and the junction between resistors 75 and 76. The second emitter of transistor 74 is connected to ground through a resistor 79. A capacitor 80 is connected between the base of transistor 74 and ground. The base of transistor 74 is also connected to the contactor of a potentiometer 81. One end terminal of potentiometer 81 is connected to resistor 75, and the second end terminal is connected to ground. The second emitter of transistor 74 is connected by a capacitor 83 to the trigger of rectifier 34. The circuits between transformer 68 and rectifiers 34 and 34' constitute pulse shaping circuits.

A positive pulse output from signal generator 60 results in a pulse being transmitted to rectifier 34 to discharge capacitor 33 through coil 23 and thereby generate an acoustical signal. This is accomplished by the positive pulse being transmitted through the amplifier formed by transistor 71 and the pulse generating circuit formed by transistor 74.

Sonic transmitter 14 is of the same construction as transmitter 13 and corresponding parts are designated by like primed reference numerals. A corresponding pulse generating circuit is associated with this transmitter and is actuated by negative pulses from signal generator 60. Thus, the generation of a square wave or similar output signal from generator 60 serves to actuate transmitters 13 and 14 alternately. If only positive or negative sawtooth output pulses are generated, only one of the transmitters is actuated.

Detector 15 can be any type of acoustical signal detector known in the art. The output signal from this detector is applied to the input of an amplifier 87. The output signal from amplifier 87 is conducted to the surface over a lead 90 which is connected to a recorder 89 at the surface.

Power source 45, signal generator 60 and recorder 89 are contained within housing 19 at the surface. The power supplies, amplifiers and signal generators illustrated in the center portion of FIG. 4 are mounted within region 32 of housing 26 of FIG. 2. Amplifier 87 is contained within the section of the logging apparatus which supports receiver 15. The connecting leads between these downhole elements are illustrated in FIGS. 2 and 3. It is important that these leads not pass through a coil of a signal generator in order to reduce the signal that would otherwise be induced by the passage of current through the coil. As illustrated in FIG. 2, partition 30 is provided with a plurality of spaced openings through which the connecting leads extend.

While this invention has been described in conjunction with a presently preferred embodiment, it obviously is not limited thereto.

What is claimed is:

1. Acoustical logging apparatus comprising;
an elongated housing adapted to be lowered into a well;
an acoustical signal receiver carried by said housing adjacent one end thereof to establish electrical signals representative of acoustical signals received by said receiver;
a source of D.C. potential carried by said housing adjacent the second end thereof;
first and second electrical pulse generators carried by said housing adjacent the second end thereof to establish electrical pulses at different times;
first and second acoustical signal generators carried by said housing in spaced relationship with one another between the first and second ends of said housing, each of said signal generators comprising an annular core of magnetostrictive material axially aligned with said housing, a toroidal coil wound on said core, a capacitor mounted immediately adjacent said core, and a controlled rectifier mounted immediately adjacent said core;
first circuit means connecting said source of potential to the capacitor of said first signal generator to charge same;
second circuit means connecting said first pulse generator to the rectifier of said first signal generator to cause said rectifier to conduct;
third circuit means connecting the capacitor and the rectifier in circuit with the coil of said first signal generator to discharge said capacitor through said coil when a pulse is applied to said rectifier from said first pulse generator;

fourth circuit means connecting said source of potential to the capacitor of said second signal generator to charge same, said fourth circuit means extending past and being positioned externally of the coil of said first signal generator;

fifth circuit means connecting said second pulse generator to the rectifier of said second signal generator to cause said rectifier to conduct, said fifth circuit means extending past and being positioned externally of the coil of said first signal generator;

sixth circuit means connecting the capacitor and the rectifier of said second signal generator in circuit with the coil of said second signal generator to discharge said capacitor through said coil when a pulse is applied to said rectifier from said second signal generator;

signal receiving means carried by said housing adjacent the second end thereof to receive electrical signals from said receiver; and seventh circuit means extending from said receiver to said signal receiving means to transmit electrical signals from said receiver to said signal receiving means, said seventh circuit means extending past and being positioned externally of the coils of said signal generators.

2. The apparatus of claim 1, further comprising an electrical signal generator positioned externally of said housing to establish electrical signals of two polarities, and eighth circuit means connected between said electrical signal generator and said pulse generators to apply signals of a first polarity to said first pulse generator and to apply signals of a second polarity to said second pulse generator.

3. The apparatus of claim 1 wherein said elongated housing comprises sections of flexible tubing extending between said signal generators and between said receiver and said second signal generator, the interior of said tubing sections being filled with liquid.

4. The apparatus of claim 3 wherein said elongated housing comprises hollow rigid sections upon which said cores are mounted and within which said capacitors and rectifiers are positioned, the interior of said rigid sections being filled with liquid.

5. The apparatus of claim 2, wherein said eighth circuit means comprises a transformer having an input primary winding and an output secondary winding, first rectifier means connecting one end terminal of said secondary winding to said first pulse generator to transmit electrical signals thereto and second rectifier means connecting the second end terminal of said secondary winding to said second pulse generator to transmit electrical signals thereto.

* * * * *